3,575,954
AZO DYESTUFFS DERIVED FROM STILBENE AND
CONTAINING A NAPHTHOTRIAZOLO GROUP
Marcel Georges Jirou and Vasili Urne, Rouen, France,
assignors to Ugine Kuhlmann, Paris, France
No Drawing. Filed Mar. 21, 1968, Ser. No. 714,765
Claims priority, application France, Mar. 24, 1967,
100,185, Patent 1,523,475
Int. Cl. C09b *43/08;* D06p *1/06, 3/60*
U.S. Cl. 260—157         3 Claims

ABSTRACT OF THE DISCLOSURE

Azo dyestuffs of the formula:

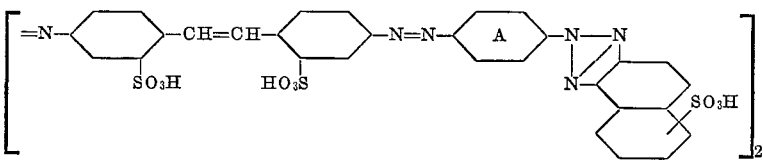

wherein the benzene nucleus A is unsubstituted or substituted by one or more alkyl and/or alkoxy groups, and process for their prepartion. These dyestuffs are particularly well suited for dyeing of cellulosic fibres and the shades obtained are distinguished by their good general fastness especially to water and washing.

---

The present invention concerns azo dyestuffs derived from stilbene and process for their preparation.

According to the present invention azo dyestuffs derived from stilbene are provided of the general formula:

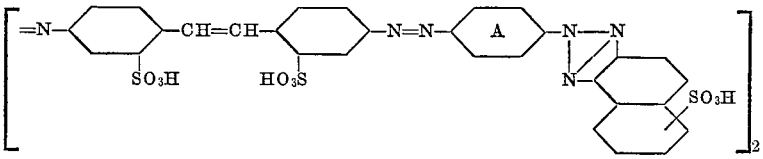

wherein the nucleus A may be substituted by one or more alkyl and/or alkoxy groups.

These dyestuffs may be prepared for example by the diazotization of 4 - amino - 4' - nitro-2,2'-stilbene-disulphonic acid, coupling, in an acid medium preferably at a pH of 4-5, the diazo derivative thus obtained with a benzene amine

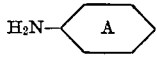

or the N-methylsulphonic derivative of such a base possibly substituted in the nucleus A and coupling in the para position relative to the amino group, hydrolysis of the methylsulphonic group if necessary, diazotisation of the amino-azo compound thus formed, reaction of the resulting diazo derivative with an amino-naphthalene monosulphonic acid coupling in the ortho position relative to the —NH$_2$ group, oxidation of the dis-azo dye obtained, for example with an ammoniacal solution of copper sulphate, and treatment of the triazolo-nitro-azo dye obtained with glucose in an alkaline medium. The reduction of the nitro groups with glucose produces an azo link between two molecules of the dyestuff and leads to the trisazo dyestuffs of the present invention. They may possibly be subjected in substance to a treatment by alkaline hypochlorite. The result is an improvement in the vivacity of the shades obtained.

The azo dyestuffs of the invention are particularly well suited for the dyeing of cellulosic fibres and the shades obtained are distinguished by their good general fastness. Subsequent treatment of the fabrics with finishing agents conferring crease-resisting properties on them has no effect on the light fastness of the dyes.

The following examples are purely illustrative and the quantities given are by weight unless otherwise indicated.

EXAMPLE 1

To a solution of sodium phenylaminomethyl sulphonate containing a proportion of this salt corresponding to 9.3 parts of free aniline and moreover 30 parts of crystalline sodium acetate is added the suspension of the diazo derivative obtained from 44.4 parts of 4-amino-4'-nitro-2,2'-stilbene-disulphonic acid. When the coupling reaction is completed the solution is made strongly alkaline and an excess of caustic soda is added so that the concentration of the latter becomes 4% by volume. The solution is heated for one hour at 80–85° C. The methyl-sulphonic group is thus eliminated. After cooling of the mixture and neutralization with hydrochloric acid the mono-azo dye is filtered off.

The paste obtained is put into suspension. 6.9 parts of sodium nitrite in solution are added and the mixture is poured into 46 parts of 19° Bé hydrochloric acid plus 200 parts of water at 20° C. At the end of 3 hours of stirring at 20° C. the diazotization is complete.

The suspension of the diazo derivative is introduced into a solution of 245 parts of the sodium salt of 1-amino naphthalene-4-sulphonic acid containing a quantity of sodium acetate which is sufficient for the pH of the mixture to attain 4.5. An excess of ammonia is added, the solution is taken to 90° C. and a solution of 50 parts of crystalline copper sulphate in 150 parts of water is added. After 12–15 hours of heating to 90° C. the oxidation to triazole is complete. The reaction product is filtered at 20° C. It is converted to the sodium salt by treatment at 70° C. with an excess of caustic soda solution. The alkaline solution is filtered and the product is reduced at 70–75° C. with 16 parts of glucose. The tris-azo dye of the formula:

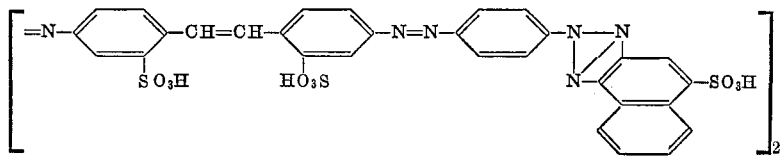

is separated by precipitation, dissolved in 1200 parts of water at 80° C., treated at this temperature with 25 parts of a solution of sodium hypochlorite containing 12% of active chlorine by volume and precipitated again. The dye colours vegetable fibres with a yellow orange shade which is fast to light and to wet tests.

EXAMPLE 2

12.1 parts of 2,5-dimethylaniline are dissolved in 160 parts of water plus 12 parts of 19° Bé hydrochloric acid and the solution is introduced into the suspension of the diazo derivative prepared from 44.4 parts of 4-amino-4'-nitro-2,2'-stilbene-disulphonic acid. The mixture is stirred for 24 hours whilst maintaining its pH at 2.8–3.0 by the gradual addition of a 30% sodium acetate solution. After filtration the monoazo dye is dissolved in the form of its sodium salt and the procedure is then as described in Example 1.

The tris-azo dye obtained colours vegetable fibres with an orange shade which is more red than that of the dye of Example 1.

EXAMPLE 3

A suspension of the diazo derivative prepared from 44.4 parts of 4-amino-4'-nitro-2,2'-stilbene disulphonic acid is neutralized to the turning point of Congo red paper with crystalline sodium acetate. It is added to a solution of 15.3 parts of 2,5-dimethoxyaniline in 570 parts of water plus about 12 parts of 19° Bé hydrochloric acid. The mixture is stirred for 24 hours. It is taken to pH 9.0 by the addition of dilute caustic soda and heated to 65–70° C. to dissolve the dye. To the hot solution obtained is added 6.9 parts of 50% sodium nitrite solution and the mixture is introduced into a mixture consisting of 46 parts of 19° Bé hydrochloric acid, 200 parts of water at 20° C. and 0.7 part of sodium nitrite. At the end of the addition the temperature has reached 40° C. This temperature is maintained for 4 hours to achieve diazotization. After having added a quantity of ice sufficient to make the temperature drop to 20° C. one slowly adds to the suspension of the diazo-azo derivative a solution of 24.5 parts of the sodium salt of 1-aminonaphthalene-4-sulphonic acid in 400 parts of water. The pH of the mixture is raised to 4.3 by adding 45 parts of crystalline sodium acetate. The procedure of Example 1 is then followed. The tris-azo dye obtained colours vegetable fibres with a reddish-orange shade.

EXAMPLE 4

If in the preceding example the 1-aminonaphthalene-4-sulphonic acid used as final coupler is replaced by 2-aminonaphthalene-5-sulphonic acid a dye is obtained of the formula:

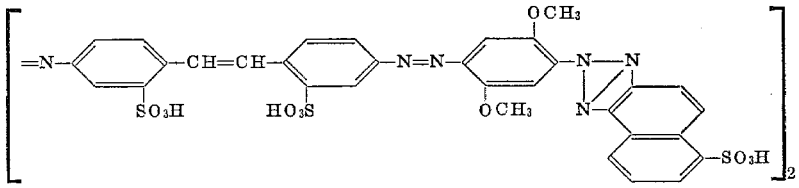

which colours vegetable fibres with a reddish-orange shade which is more vivid than that of the dye of Example 3.

We claim:
1. Azo dyestuff of the formula:

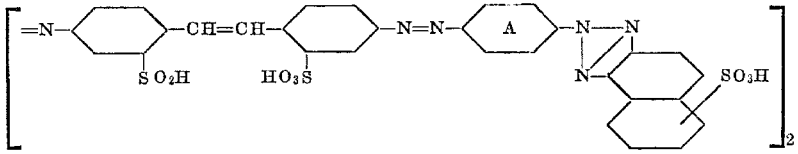

wherein the benzene nucleus A is unsubstituted or substituted by one or two methyl or methoxy groups.

2. Azo dyestuff of the formula:

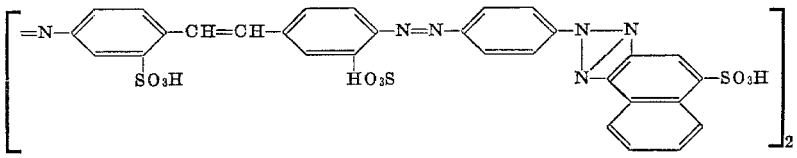

3. Azo dyestuff of the formula:

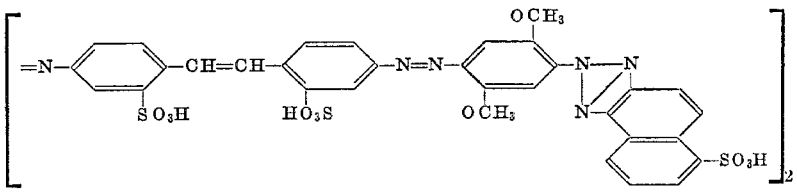

References Cited

UNITED STATES PATENTS

| | | | |
|---|---|---|---|
| 2,746,953 | 5/1956 | Dickey et al. | 260—157X |
| 3,186,980 | 6/1965 | Litke | 260—157 |
| 3,310,551 | 3/1967 | McLeod | 260—157 |
| 3,320,231 | 5/1967 | Ammann et al. | 260—157X |
| 3,325,467 | 6/1967 | Jirou et al. | 260—157X |
| 3,414,558 | 12/1968 | Nickel et al. | 260—157 |
| 3,415,808 | 12/1968 | Weber et al. | 260—157X |

FLOYD DALE HIGEL, Primary Examiner

U.S. Cl. X.R.

8—41, 50; 260—144, 178